July 26, 1927.
L. D. SOUBIER
1,636,875
GLASS FEEDER
Filed March 5, 1924
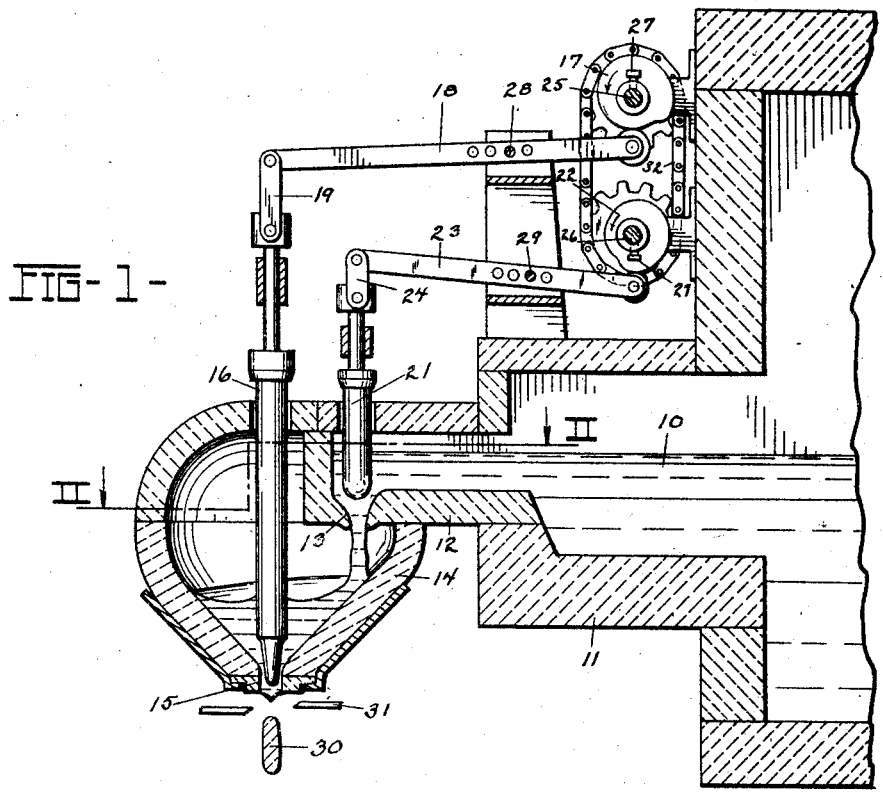
FIG-1-
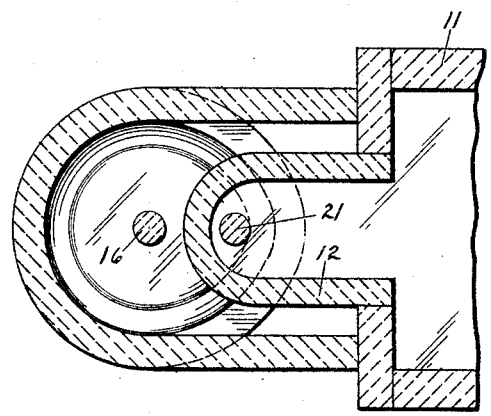
FIG-2-
INVENTOR
LEONARD D. SOUBIER
BY J. F. Rule.
HIS ATTORNEY.

Patented July 26, 1927.

1,636,875

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed March 5, 1924. Serial No. 696,937.

My invention relates to glass feeding apparatus by which molten glass, supplied from a tank or furnace, is segregated into individual masses or charges suitable for entering the molds of machines for forming glass articles.

The invention is herein shown as embodied in an apparatus of the type in which the molten glass from the furnace flows into a receptacle or charger having an outlet opening in its bottom, through which the glass is discharged, a reciprocating plunger or regulator working in the glass over the outlet being provided to control the flow and shape the issuing glass.

An object of the invention is to provide improved means for controlling the flow of glass into the container. Such means includes a reciprocating plunger or regulator by which the flow of glass into the container is controlled and measured quantities of glass are delivered to the container.

Other objects of the invention will appear hereinafter.

In the accompanying drawings:

Figure 1 is a sectional elevation of an apparatus constructed in accordance with my invention.

Figure 2 is a sectional plan at the planes of the line II—II on Figure 1.

Molten glass 10 flows from the forehearth 11 of the furnace or refining tank into an extension or trough 12 provided with an outlet opening 13 in the bottom thereof adjacent its forward end. A receptacle or charger 14 having downwardly converging walls is arranged below the outlet 13, so that the glass flows directly into the charger, said charger entirely enclosing the outlet opening 13 of the trough. The glass in the charger is discharged through an outlet opening 15 in the bottom thereof. The discharge is controlled by a regulating plunger 16, which projects vertically downward into the glass in the charger and is periodically reciprocated vertically by means of a cam 17 operating through a lever 18, connected through links 19 to the regulating plunger.

The flow of glass through the outlet 13 is controlled by a plunger 21 which projects downward into the glass over the outlet. The plunger 21 is reciprocated by means of a cam 22 operating through a lever 23, connected through links 24 to the plunger. The cams 17 and 22 are mounted respectively on shafts 25 and 26 having a sprocket wheel and chain connections 32 and continuously rotated at the same angular speed, whereby both regulators 21 and 16 are periodically reciprocated in synchronism. The cams are both rotatively adjustable and are held in adjusted position by set screws 27. By adjusting either cam, the timing of the corresponding plunger is adjusted relatively to that of the other plunger. The levers 18 and 23 are provided with adjustable fulcrums 28 and 29 respectively, permitting the length of stroke of either plunger to be adjusted. By adjusting the length of stroke of the plunger 21, the amount of glass permitted to flow through the outlet 13 is varied and may be regulated to correspond to the amount of glass discharged through the outlet 15.

In operation, the up and down movement of the plunger 21 causes a periodically varying or fluctuating flow of glass into the charger. When said plunger is lifted, a sufficient quantity of glass flows into the charger to form a mold charge or gob 30. When the plunger is in its lowermost position, the flow may be practically stopped, or reduced to a thin stream. During its descent, the plunger 16 exerts an expelling force on the glass in the charger, causing the glass to issue in the form of a suspended mass or gob which is automatically severed by shears 31.

Modifications may be resorted to within the spirit and scope of my invention.

What I claim is:

1. In glass feeding apparatus, the combination of a container for molten glass having an outlet opening through which the glass is discharged downwardly, a second container below said outlet and having an outlet opening in its bottom, said second container arranged to entirely enclose the first outlet opening and receive the glass discharged from the first mentioned container, the walls of the second container converging downwardly toward the second outlet opening, regulating plungers in said containers, and means for periodically reciprocating said plungers toward and from the respective openings.

2. In glass feeding apparatus, the combination of a container for molten glass having an outlet opening in its bottom through which the glass is discharged, a second container having an outlet opening in its bottom, said second container arranged to entirely enclose the first outlet opening and receive the glass discharged from the first mentioned container, the walls of the second container converging downwardly toward the second outlet opening, regulating plungers in said containers, and automatic means for periodically reciprocating said plungers vertically toward and from the respective outlet openings.

3. In glass feeding apparatus, the combination of a furnace for molten glass having an extension into which the glass flows from the body of the furnace, said extension having an outlet opening in the bottom thereof, a plunger projecting downward into the glass over said opening, a receptacle beneath said opening into which the glass flows from said opening, said receptacle having a discharge opening in the floor thereof, said receptacle entirely enclosing the first opening and having side walls converging downwardly toward the second outlet opening, a plunger projecting downward into the glass in said receptacle over the opening, and means to periodically reciprocate said plungers vertically and in synchronism.

4. In glass feeding apparatus, the combination of a furnace for molten glass having an extension into which the glass flows from the body of the furnace, said extension having an outlet opening in the bottom thereof, a plunger projecting downward into the glass over said opening, a receptacle beneath said opening into which the glass flows, said receptacle having a discharge opening in the floor thereof, a plunger projecting downward into the glass in said receptacle over the opening, and means to periodically reciprocate said plungers vertically and in synchronism, said means comprising drive shafts, cams thereon, levers actuated by the cams, and operating connections between the levers and the respective plungers.

5. In glass feeding apparatus, the combination of a furnace for molten glass having an extension into which the glass flows from the body of the furnace, said extension having an outlet opening in the bottom thereof, a plunger projecting downward into the glass over said opening, a receptacle beneath said opening into which the glass flows, said receptacle having a discharge opening in the floor thereof, a plunger projecting downward into the glass in said receptacle over the opening, means to periodically reciprocate said plungers vertically and in synchronism, said means comprising drive shafts, cams thereon, levers actuated by the cams, and operating connections between the levers and the respective plungers, said drive shafts being rotatable at the same angular speed, and adjusting means for adjusting the relative rotative positions of the cams on the drive shafts and thereby adjusting the relative timing of the plungers.

Signed at Toledo, in the county of Lucas and State of Ohio, this 27th day of February, 1924.

LEONARD D. SOUBIER.